J. K. DUGDALE.
Seed-Dropper.
No. 38,099.
Patented Apr. 7, 1863.
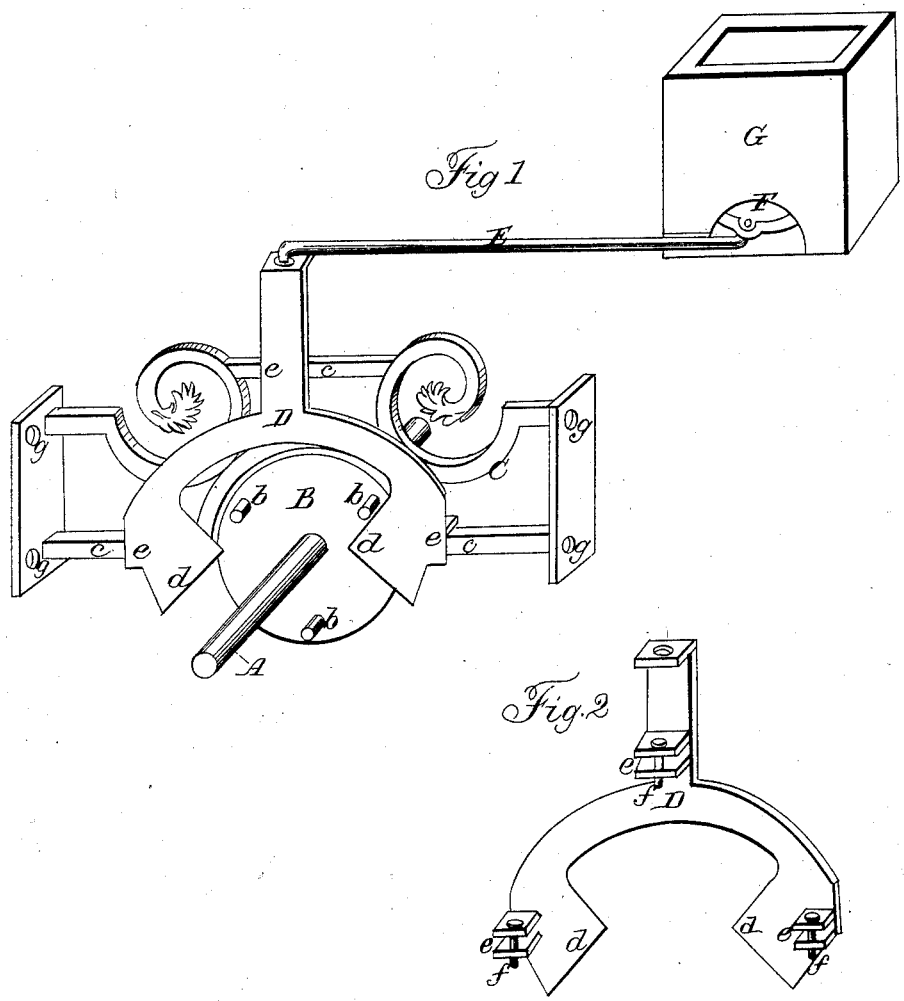
Witnesses:
John Finley
Saml G Dugdale
Inventor:
James K Dugdale

UNITED STATES PATENT OFFICE.

JAMES K. DUGDALE, OF RICHMOND, INDIANA.

IMPROVED METHOD OF ACTUATING THE FEEDING APPARATUS OF SEED-PLANTERS.

Specification forming part of Letters Patent No. 38,099, dated April 7, 1863.

*To all whom it may concern:*

Be it known that I, JAMES K. DUGDALE, of the city of Richmond, in the county of Wayne and State of Indiana, have invented a new and useful Improved Method of Actuating the Slides or Feeding Apparatus of Seed-Planters; and I do hereby declare that the following is a full, clear, and exact description of the construction and operation of the same, reference being had to the annexed drawings, making a part of this specification, in which—

Figure 1 is a perspective view of the improvement, and Fig. 2 a perspective view of a detached part thereof.

The nature of my improvement consists in an arrangement for feeding at given distances by producing a reciprocal motion from a revolving shaft or axle by means of a wheel on said shaft, with projections or pins on the side of the wheel near the periphery, at equal distances apart and at an equal distance from the center. I have three pins on one side of the wheel. Two of them may be made to screw in, that they may be taken off and put on when desired, and a different number (always an odd number) of pins on the other side of the wheel at the same distance from the center. As the wheel revolves, one of the pins presses against a double-bevel point attached to a sliding device, which shoves said sliding device forward. Next a pin presses against a similar double-bevel point attached to the sliding device on the opposite edge of the revolving wheel, shoving it backward. A frame partly encircling the periphery of the wheel, with suitable rods or bars for holding the sliding device in its place, is attached to the frame of the seed-planter. Eyes or guides with an open side are attached to the sliding device to slide on the rods or bars in the frame, and are held on by pins or screws or springs, which by taking out the sliding device may be slipped off and reversed and put on the opposite side and fastened in a few minutes, giving a faster or slower motion to the feed, according to the number of pins, thereby planting the seed at a greater or less distance apart, which will be in proportion to the number of pins with the circumference of the driving wheel or wheels. It will be seen that with a vibrating or sliding feed-plate, with an orifice on each side of a cut-off plate, at every revolution of the driving-shaft, with one pin it will feed twice, with three pins six times, with five pins ten times, &c., and with a driving-wheel the circumference of which is four feet the distance apart will be two feet eight inches, and four and eight-tenths inches. If the circumference of the driving-wheel is greater or less, the distance will be greater or less. Shut off the feed on one side, it will feed half as often and twice the distance apart. If it is desirable to have a greater number of changes, other wheels with pins may be added and the frame and sliding device applied to them.

Letter A, Fig. 1, represents a section of a shaft or axle of a seed-planter; B, the wheel, showing three pins, *b b b;* C, the frame, partly encircling wheel B; *c c c*, rods or bars on which the sliding device slides; D, the sliding device; *d d*, the double-bevel points attached to the sliding device; *e e e*, eyes or guides sliding on rods or bars *c c c*.

Fig. 2 shows the opposite side of the sliding device. *e e e* are the eyes or guides; *f f f*, screws to hold it to its place on the frame C. The frame C is attached to the frame of the machine by bolts at *g g g g*, or equivalents.

E, Fig. 1, is a rod connecting the sliding device with a feed-plate, F, in hopper or seed-box G, the end of the rod dropping into an eye for that purpose in the upright of the sliding device, or at any other point desired.

What I claim as my invention, and desire to secure by Letters Patent, is—

The sliding device D, in combination with the frame C and wheel B, when used in connection with the feeding mechanism of a seed-planter, as and for the purpose set forth.

JAMES K. DUGDALE.

Witnesses:
JOHN FINLEY,
SAML. G. DUGDALE.